H. W. OSTER.
DIE STOCK.
APPLICATION FILED MAY 17, 1913.

1,128,034.

Patented Feb. 9, 1915.

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

DIE-STOCK.

1,128,034.  Specification of Letters Patent.  Patented Feb. 9, 1915.

Application filed May 17, 1913. Serial No. 768,215.

*To all whom it may concern:*

Be it known that I, HERMAN W. OSTER, a citizen of the United States, residing at Cleveland, in the county of Cuyahoga and State of Ohio, have invented a certain new and useful Improvement in Die-Stocks, of which the following is a full, clear, and exact description.

This invention is an improvement upon the kind of ratchet die stocks which include a tubular work holder adapted to embrace and be secured to the pipe to be threaded, a concentric die carrier which is movable rotatably and longitudinally with respect to the work holder, and an operating lever having a ratchet connection with the work holder, whereby the latter may be turned. One trouble with die stocks of this sort is that sometimes when the operating lever is turned backward it causes the die carrier to likewise turn backward. This is decidedly objectionable; and the primary object of this invention is to prevent this action; and to provide an operative practical ratchet die stock in which this action cannot occur.

The invention consists in the combination of parts hereinafter described and pointed out definitely in the claims.

Figure 1:
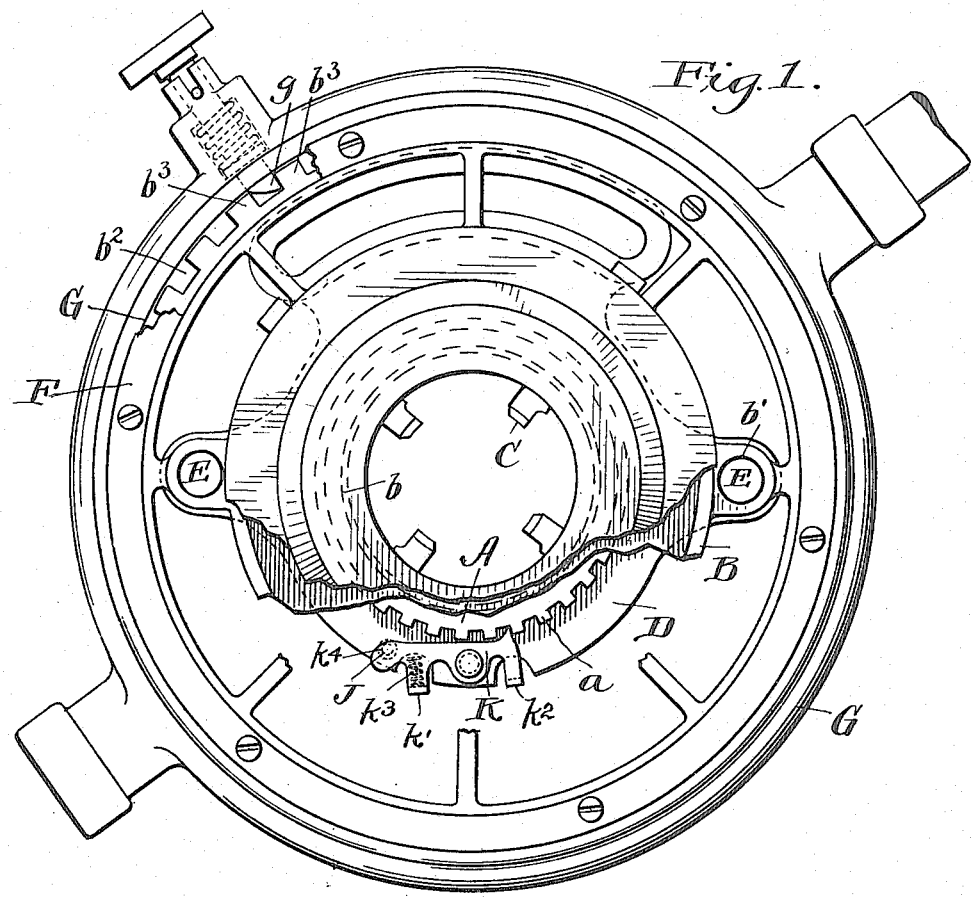
Figure 2:
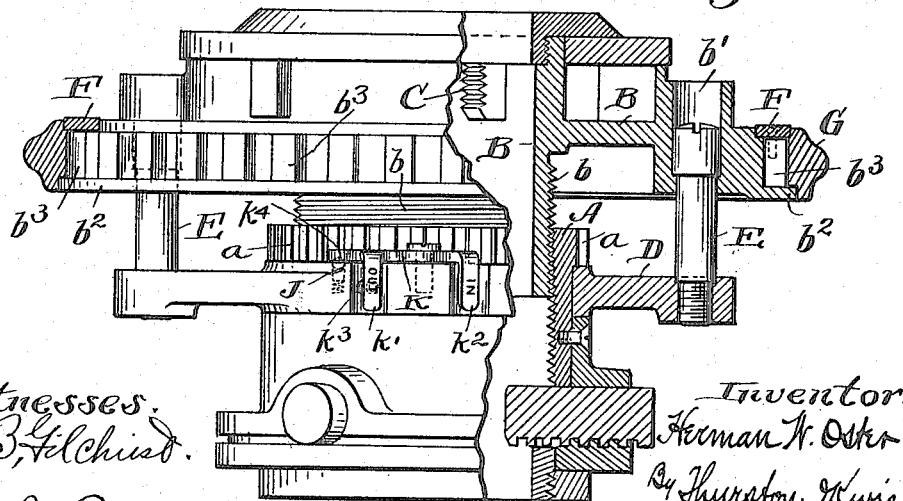

In the drawing, Figure 1 is a front end view partly broken away, of a ratchet die stock embodying the invention. Fig. 2 is a side elevation partly in longitudinal section.

Referring to the parts by letters, A represents the tubular work holder which is provided with suitable well known means by which it may be rigidly fixed to the pipe around which it is placed.

B is the tubular die carrier having a sleeve $b$ which is adapted to telescope into the work holder. Preferably this sleeve is externally threaded, and the work holder is internally threaded so that the former may be screwed into the latter. These engaging threads form what is known in this art as a lead screw, a desirable but not essential feature of the construction. The dies C are carried by the die carrier, and are adjustably held in place thereon by any suitable or usual means.

A ring D is rotatably mounted upon the work holder in a circumferential groove thereon, so that while it may be turned upon the work holder it cannot move longitudinally with respect thereto. Pins E fixed to this ring project through longitudinal holes $b^1$ in the die carrier; and therefore the ring D must turn with the die carrier, although, the die carrier in turning moves longitudinally with respect to said ring.

A ratchet sleeve G is rotatively mounted upon the outer edge of the die carrier, being held against longitudinal movement thereon by the flange $b^2$ and the gib ring F. The outer periphery of the die carrier between the flange $b^2$ and gib ring F is formed with ratchet teeth $b^3$. The sleeve G carries a spring pawl $g$ which, on its inner end, is beveled as shown, so that when the sleeve is turned in one direction relative to the die carrier, the beveled end of the pawl engaging one of the teeth $b^3$ will be thrust backward and the sleeve G allowed to turn on the die carrier. When the sleeve is turned in the opposite direction, the pawl will go between two teeth $b^3$ and therefore the die carrier will be compelled to turn with the sleeve.

On the outer cylindrical surface of the work holder in front of the ring D are the ratchet teeth $a$. A pawl K is pivoted to the front face of ring D and is adapted to engage with said ratchet teeth. The end of the pawl is beveled so that when the die carrier and consequently ring D, are being turned in the thread cutting direction relative to the work holder, the pawl will slip over the ratchet teeth. When, however, the die carrier and ring are subjected to a force tending to turn them in the contrary direction, this pawl will automatically engage the ratchet teeth and prevent such turning relative to the work holder.

The pawl K has two fingers $k^1$, $k^2$ which are bent down by the side of the ring D. A coil spring $k^3$ interposed between one of these fingers $k^1$ and the ring acts on the pawl to hold it in engagement with the ratchet teeth. The other finger $k^2$ affords a convenient handle wherewith the operator may move the pawl. When it is desired (as it is when the die carrier is being backed off of a threaded pipe) to disengage the pawl K from the work holder, the operator takes hold of the finger $k$ and pulls it outward, thereby rocking the pawl in opposition to its spring. In that face of the tail of the pawl which is adjacent to the front face of the ring D there is a spot hole $k^4$ which is adapted to engage with the outer end of a spring plunger J seated in a recess in the ring. When the pawl is wholly withdrawn from engagement with the ratchet, this plunger engaging in this spot hole will hold the pawl in the withdrawn position until sufficient pressure is applied to the pawl to so swing it as to cause the disengagement of said plunger and spot hole.

Having described my invention, I claim:

1. In a die stock, the combination of a tubular work holder adapted to be secured to the pipe to be threaded, a tubular die carrier which is rotatable and movable longitudinally with respect to the work holder, a ring which is rotatable upon the work holder but is incapable of longitudinal movement thereon, means compelling the die carrier and ring to rotate in unison, a ratchet sleeve rotatable upon the die carrier, a ratchet connection between said sleeve and die carrier, and a ratchet connection between the work holder and the ring which is rotatably mounted thereon.

2. In a die stock, the combination of a tubular work holder, a concentric tubular die carrier which is rotatable and movable longitudinally with respect to the work holder, a ring which is rotatable upon the work holder but is incapable of longitudinal movement thereon, means compelling the die carrier and ring to rotate in unison, a ratchet sleeve rotatably mounted upon the die carrier, a ratchet connection between said sleeve and die carrier, a spring pawl mounted on the ring, there being ratchet teeth on that part of the work holder which is adjacent to said ring with which said spring pawl may be engaged.

3. In a die stock, the combination of a tubular work holder, a concentric tubular die carrier which is rotatable and movable longitudinally with respect to the work holder, a ring which is rotatable upon the work holder but is incapable of longitudinal movement thereon, means compelling the die carrier and ring to rotate in unison, a ratchet sleeve rotatably mounted upon the die carrier, a ratchet connection between said sleeve and die carrier, a spring pawl mounted on the ring, there being ratchet teeth on that part of the work holder which is adjacent to said ring with which said spring pawl may be engaged, and means for holding said spring pawl out of engagement with said ratchet teeth.

In testimony whereof, I hereunto affix my signature in the presence of two witnesses.

HERMAN W. OSTER.

Witnesses:
R. B. TEWKSBURY,
JAY A. HIGBEE.

Copies of this patent may be obtained for five cents each, by addressing the "Commissioner of Patents, Washington, D. C."